Patented Feb. 11, 1941

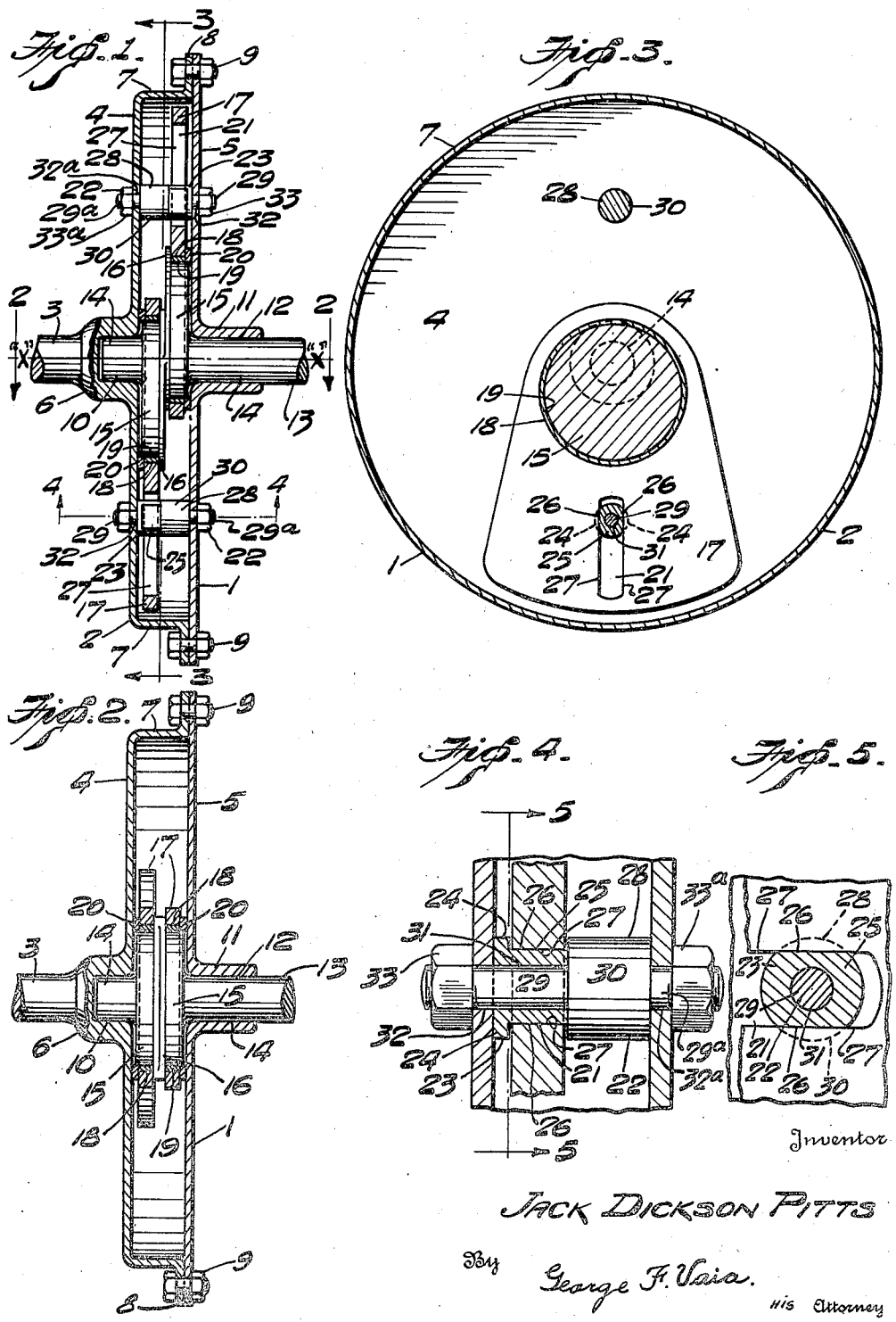

2,231,832

UNITED STATES PATENT OFFICE 2,231,832

TRANSMISSION

Jack Dickson Pitts, East Falls Church, Va., assignor of fifty per cent to Arthur John McCrary, Carroll, Iowa Application September 26, 1939, Serial No. 296,680

2 Claims. (Cl. 74—64)

The present invention relates to a transmission.

An object of the invention is the provision of means related and associated with another means both of which are movable relatively to one another so that upon attainment of a predetermined torque speed the two means will be locked or arrested against relative movement and thereby rotate as a single unitary structure.

Another object of the invention is the provision of means associated with two relatively movable elements so that during an initial torque movement of one of said elements the means is adapted for or capable of movement relative to both of said elements without transmitting power from one element to the other element, and upon an increase in the torque speed of one of the elements the means will function as a lock to prevent movement between the elements and thereby permit the elements and means to operate as a rigid unit.

A further object of the invention is the provision of relatively and rotatively movable elements arranged in such a manner that power transmitted from one element to another element is proportional to the speed of one of the elements.

A still further object of the invention is the provision, in a transmission, of relatively movable means arranged and constructed whereby the torque speed of one of the means is determinative of the torque speed of another of the means so that the various means will rotate at different speeds to impart a varying amount of power to one of the means.

An additional object of the invention is the provision of a driving means and a relatively movable driven means with an intermediate means movably associated with the driving and driven means so that upon a torque movement being imparted to the driving means the intermediate means may ultimately, through centrifugal force, lock or arrest the movement of the driven means against movement relatively to the driving means to enable all of the means to operate as a rigid structure.

The above as well as numerous other objects will become apparent from the succeeding description considered together with the accompanying drawing which discloses merely an exemplified form of the invention and wherein:

Figure 1 is a vertical sectional view of a transmission embodying a form of the present invention.

Figure 2 is a horizontal sectional view taken along the lines 2—2 of Figure 1, looking in the direction of the arrows.

Figure 3 is a transverse sectional view taken along the lines 3—3 of Figure 1, looking in the direction of the arrows.

Figure 4 is an enlarged sectional view taken along the lines 4—4 of Figure 1, looking in the direction of the arrows.

Figure 5 is a sectional view taken along the lines 5—5 of Figure 4, looking in the direction of the arrows.

Referring now in detail to the drawing wherein like reference characters designate like parts, the numeral 1 is employed to designate generally a transmission having as one of its component parts a housing 2 which may be of various designs and arrangements, as no particular configuration and association of parts is preferred. The housing is arranged and adapted to rotate about a longitudinal axis, indicated diagrammatically by the lines $x$—$x$, and for the accomplishment of this purpose there is secured thereto, either integrally or movably as the occasion requires or it is desired, a driving or power shaft 3 which derives a torque movement from any desired source. The housing may be formed of longitudinally spaced disks or plates 4 and 5, the former of which is provided with an axial hub 6 and has its peripheral edge merging into an angularly disposed annular flange 7 directed toward and terminating against the plate 5. Directed radially from the free extremity of the flange 7 is an outwardly directed end or securing flange 8 bearing against or in intimate contact with the plate 5. Securing means of any character and illustrated in the present embodiment by a commercial form of bolts 9 extends through the end flange 8 and plate 5 to rigidly secure the two plates together, thereby preventing the ingress of dust, dirt or any foreign substance to the interior of the housing as well as forming the introduction of means whereby a torque movement may be transmitted from the plate 4 to the plate 5 to permit the two plates to rotate as a housing unit.

The plate 4 has an axial bore 10 opening inwardly of the housing to present a bearing for the purpose to be hereinafter explained. The plate 5 has, directed outwardly of the housing and away from the plate 4, an axially disposed collar or ring-like flange 11 having a bearing forming bore 12 in longitudinal alignment with the hub bearing to thereby provide a pair of longitudinally spaced bearings in the housing, both of which are concentric with the longitudinal axis $x$—$x$.

Associated with the housing is a driven or load shaft 13 having spaced axle portions 14 extending into, occupying or seated in the housing bearings, and, as will be noted, this spaced movable connection between the housing and driven shaft will prevent a transverse deviation of the driving and driven shafts from their common axis or maintain the shafts in a true alignment. The driven shaft 13 is normally freely and rotatively movable with respect to the housing which would permit, in the absence of any other or related elements, the driven shaft and housing to rotate independently of one another. Formed on the driven shaft within the confines of the housing or intermediate the planes of the housing forming plates are a plurality of, preferably two, bearings 15 formed excentrically with respect to the longitudinal axis $x$—$x$. The excentrics or bearings 15 are opposed relatively to each other or spaced diametrically to present oppositely directed lever arms extending transversely of the driven shaft 13. It will, of course, be clearly understood that two or more of such excentrics may be formed on the driven shaft so long as the number of excentrics formed is evenly or equally spaced about the shaft, the primary purpose thereof being to maintain the driven shaft balanced to eliminate lateral thrusts being created in the transmission.

The inner or adjacent extremities of the excentrics are provided with thrust flanges 16 which function as inner defining or retaining means.

Since the housing and driven shaft are freely and independently rotatable, means has been provided to transmit a torque movement from the driving shaft to the driven shaft in such a manner that through the setting up of centrifugal force the power transmitted to the driven shaft will, to the attainment of a predetermined torque speed of the driving shaft, be proportional to the speed of the latter, and beyond this abovementioned speed both shafts will be locked against a torque movement relative to one another to thereby rotate as a single rigid structure. As will be noted from the succeeding description, the means is arranged and constructed to initially rotate with respect to the driven shaft and oscillate with respect to the housing and driving shaft so that during a gradual increase in the torque speed of the driving shaft the rotative and oscillatory movements of the means will be correspondingly diminished during which time the rotative movement of the driven shaft will be gradually increased to approach the speed of the driving shaft and housing. A continuation in the impetus of the driving shaft will result in the cessation of the rotative and oscillatory movements of the means to thereby effectuate a torque movement of the driving shaft, housing means and driven shaft as a rigid integral unit or device.

For the accomplishment of the above there are journaled on the excentrics and, in the present embodiment, directed oppositely or extending away from one another, a plurality of cam-shaped weight means or load arms 17 capable of rotating with respect to the excentrics and oscillating or moving radially with respect to the housing. Each load arm has adjacent the shaft extremity thereof an aperture 18 occupied by a wear plate or removable liner 19 of any desired material and preferably press-fitted therein so as to ensure against movement between the liner and associated load arm and materially diminish the possible enlargement of the load arm apertures during continued service. The liners are of a diameter slightly greater than the diameters of the excentrics so as to afford a running fit therewith. Positioned adjacent the plate or disk side of each load arm is a thrust ring 20 in bearing relation with the weight means and retained in operable position by means of the associated housing disk. The thrust rings are removably associated with the excentrics to facilitate the application and removal of the weight means and form a counterpart of the inner thrust flanges 16 to retain the load arms in full journaled relation with the excentrics.

A connection is provided between the weight means and housing so that any movement imparted to the housing plates will be instantly transmitted to the load arms to cause their movement about the excentrics, and since this last-mentioned movement will, due to the bearings 15 being transversely related with respect to the center of rotation, result in the load arms oscillating relative to the housing plates, suitable bearing areas are formed on the connection. Accordingly, each weight means has, intermediate the ends thereof, an elongated orifice or slot 21 the center line of which is in alignment with or bisects the longitudinal axis x—x of the transmission. Removably associated with the housing plates and each load arm is a connecting guide or retaining means 22 which may be of various constructions and designs and is represented in the instant structure by a movable ferrule, thimble or wear block 23 having collar forming flanges 24 interposed between the associated weight means and adjacent housing disk in the proximity of the load arm orifice. Each wear block has a portion 25 thereof projecting through the related load arm orifice and formed frusto-cylindrical in cross section to present substantially parallel guide surfaces 26 in bearing relation with the orifice defining surfaces 27, thereby arranging a surface bearing contact between the wear blocks and load arms of appreciable extent to diminish or substantially eliminate wear therebetween during a continued service thereof.

Forming a component part of each connecting or guide means is a spacer bolt 28 having oppositely directed studs or stems 29 and 29ª projecting laterally from a substantially central shoulder or cylindrical enlargement 30, the latter of which is in abutting relation with or interposed between the associated ferrule and housing plate or disk, and, as will be noted, a related ferrule and shoulder form a guideway for a load arm to prevent its movement longitudinally of the transmission and retain it in a predetermined operable position in alignment with its excentric. The stem 29 of each bolt occupies a longitudinally extending aperture 31 in each thimble to continue therebeyond and project through an aperture 32 in one of the housing plates to have the free extremity thereof provided with a removable element or nut 33 positioned outwardly of the housing and bearing against the related plate. The stem 29ª of each bolt extends through the aperture 32ª in the other of the housing plates in alignment with the plate aperture 32 on the corresponding side of the longitudinal axis $x$—$x$. Like the stems 29, the studs 29ª are also provided with removable elements or nuts 33ª rotatably associated with the free extremities thereof and positioned outwardly of the related housing disks. As will be noted, the nuts 33 and 33ª may be drawn together on their respective stems to such an extent that the housing plates are maintained in proper spaced relation and that the wear blocks 23 may move axially freely with respect to the stems 29 upon angular movement of the load arms from their normal or static position.

It will, of course, be clearly understood that, if preferred, the housing bolts 9 may be entirely dispensed with since the guide means 22 form connections between the spaced housing plates, and accordingly any impetus imparted to the housing disk 4 will be transferred to the housing disk 5 through the medium of the guide means to accomplish a simultaneous movement of the housing forming disk.

As previously stated, merely an exemplified form of the invention is illustrated and described, and various alterations and changes may be made to the structure without departing from within the spirit and scope of the appended claims.

I claim:

1. In a transmission, the combination of a housing formed of a pair of spaced plates provided with axial bearings, an integral shaft having portions thereof positioned in said bearings, juxta-positioned excentrics on said shaft between said plates, juxta-positioned flanges on said excentrics, oppositely directed cam-shaped weights mounted on said excentrics and movable relatively to said shaft and plates, said cam-shaped weights being prevented from shifting toward one another longitudinally of said shaft by said flanges, a thrust ring associated with each excentric and interposed between each weight and related plate, apertures in said weights outwardly of said excentrics, guide means positioned within said apertures arranged and constructed to retain said weights in a predetermined position between said plates and present a surface bearing for said plates, and means connecting said guide means and plates.

2. In a transmission, the combination of a pair of spaced plates provided with axial bearings, an integral shaft rotatably movable relative to said plates and having portions thereof seated in said bearings, transversely spaced excentrics formed on said shaft between said plates, oppositely directed weights between said plates and journaled on said excentrics, related flanges formed integral with said excentrics and being positioned between said weights, said weights upon a rotation of said plates being adapted to oscillate with respect to said plates and rotate with respect to said shaft, means in intimate contact with and interposed between said plates and weights for preventing said weights from shifting away from one another longitudinally of said shaft, and means extending through slots in said weights, and said last named means each including a wear block between said plates pivotally mounted on a bolt connected to said plates, said plates, weights and shaft being adapted to rotate as a mass about a common axis upon a sufficient torque movement being applied to said plates.

JACK DICKSON PITTS.